(12) United States Patent
Solfrank et al.

(10) Patent No.: US 8,157,451 B2
(45) Date of Patent: Apr. 17, 2012

(54) BEARING ARRANGEMENT OF A SHAFT

(75) Inventors: Peter Solfrank, Frensdorf (DE);
Matthias Fick, Schnaittach (DE);
Alexander Tasche, Nuremberg (DE)

(73) Assignee: Schaeffler KG, Herzogenaurach (DE)

( * ) Notice: Subject to any disclaimer, the term of this patent is extended or adjusted under 35 U.S.C. 154(b) by 504 days.

(21) Appl. No.: 12/475,073

(22) Filed: May 29, 2009

(65) Prior Publication Data

US 2009/0297085 A1 Dec. 3, 2009

(30) Foreign Application Priority Data

May 30, 2008 (DE) .................. 10 2008 026 204

(51) Int. Cl.
*F16C 23/04* (2006.01)
*F16C 9/00* (2006.01)
*F16C 33/58* (2006.01)
(52) U.S. Cl. .................. 384/558; 384/457; 384/751
(58) Field of Classification Search .................. 384/447, 384/456, 457, 548, 558, 569, 571
See application file for complete search history.

(56) References Cited

U.S. PATENT DOCUMENTS

| | | | | | |
|---|---|---|---|---|---|
| 3,307,891 | A | * | 3/1967 | Carullo | 384/569 |
| 4,836,758 | A | * | 6/1989 | Elson et al. | 418/55.5 |
| 5,286,117 | A | * | 2/1994 | Wojan et al. | 384/513 |
| 5,529,402 | A | * | 6/1996 | Murphy | 384/564 |
| 5,902,022 | A | * | 5/1999 | Shattuck et al. | 384/569 |
| 6,644,860 | B2 | * | 11/2003 | Fuchida et al. | 384/569 |
| 2002/0110301 | A1 | * | 8/2002 | Niina | 384/569 |

FOREIGN PATENT DOCUMENTS

| | | |
|---|---|---|
| DE | 372146 | 3/1923 |
| DE | 1 122 781 | 12/1955 |
| DE | 2 149 333 | 10/1971 |
| DE | 102 35 290 | 8/2002 |
| DE | 10 2007 062 482 | 12/2007 |
| JP | 2004-69034 | 3/2004 |
| JP | 2004-109765 | 4/2004 |
| JP | 2006-46560 | 2/2006 |

* cited by examiner

*Primary Examiner* — Thomas R Hannon
*Assistant Examiner* — Alan Waits
(74) *Attorney, Agent, or Firm* — Fitzpatrick, Cella, Harper & Scinto

(57) ABSTRACT

A bearing arrangement of a roller-mounted unbalanced mass shaft. The rollers are in punctiform contact with one of the raceways at a low shaft rotational speed, and in linear contact with both raceways at a high shaft rotational speed.

10 Claims, 2 Drawing Sheets

BEARING ARRANGEMENT OF A SHAFT

This application claims the priority of DE 10 2008 026 204.8 filed May 30, 2008, and is incorporated by reference herein.

FIELD OF THE INVENTION

The invention relates to a bearing arrangement. The latter comprises a shaft which is mounted rotatably in a housing having a bearing journal, an antifriction bearing which encloses the bearing journal, an inner raceway which is fixed to the shaft and an outer raceway which is fixed to the housing, for the rolling bodies of the antifriction bearing, one of the raceways having a diameter which is variable in the longitudinal direction of the shaft and is adapted to its elastic line.

Moreover, the invention relates to a needle bearing for the bearing arrangement.

BACKGROUND OF THE INVENTION

A bearing arrangement of this type is apparent from DE 372146 which is considered to form the generic type. The roller mounting of the shaft which deflects under its operating load is designed in such a way that the number of loadbearing rolling bodies increases with the loading and as a result with the deflection of the shaft. For this purpose, that bearing journal of the shaft which serves as inner rolling body raceway or the housing which serves as outer rolling body raceway is of parabolic configuration according to the elastic line of the shaft. A disadvantage of this known bearing arrangement is the considerable axial installation space requirement of the antifriction bearing which is configured as a four row ball bearing with, as is known, a small individual load rating of the balls.

OBJECT OF THE INVENTION

The present invention is therefore based on the object of developing a bearing arrangement of the type mentioned in the introduction, in such a way that the stated disadvantage is eliminated by way of simple means. Accordingly, the antifriction mounting is to be stable and have a long service life even in the case of relatively large deflections, and in the process is to require an installation space as small as possible both in the axial direction and in the radial direction, and additionally, is to be producible as far as possible without affecting costs in comparison with standard mountings.

SUMMARY OF THE INVENTION

This object is achieved by the distinguishing features of claim 1, while advantageous developments and refinements of the invention can be gathered from the subclaims. Accordingly, the rolling bodies are to be the rollers of a cylindrical roller bearing or needle bearing, the raceway with a variable diameter being such that the rollers are in punctiform contact with one of the raceways at a low rotational speed of the shaft which is configured as an unbalanced mass shaft, and are in linear contact with both raceways at a high rotational speed of the unbalanced mass shaft.

As a result, the unbalanced mass shaft which deflects increasingly with the rotational speed on account of its unbalance action is mounted in such a way that an eccentric punctiform contact is produced between the rollers and the raceway with a variable diameter in the low rotational speed range of the unbalanced mass shaft which then deflects to a correspondingly low extent, and an ideally linear contact is produced between the rollers and the raceway with a variable diameter in the high rotational speed range of the unbalanced mass shaft which then deflects to a correspondingly more pronounced extent.

This refinement is based on the concept that firstly onesided bearing of the individual rolling bodies in a punctiform contact is harmless in the low rotational speed range of the unbalanced mass shaft on account of the bearing load which is then low. It is to be mentioned at this point that it goes without saying that the expression "punctiform contact" is to be understood not only as the strictly geometric meaning of a contact point without area, but also as a small contact ellipse or the like with regard to the roller longitudinal extent as a function of the instantaneous contact pressure. Secondly, in the high rotational speed range of the unbalanced mass shaft, sufficiently stable linear contacts arise in its unbalance loading range with correspondingly low Hertzian stresses between the raceways and the rollers. However, the resulting saving of axial and radial installation space for the antifriction mounting is to be seen not only in relation to the bearing arrangement with ball bearing cited in the introduction, but also in relation to needle mountings of unbalanced mass shafts which are known per se and of conventional design. This is because, even in the latter case, the bearing arrangement according to the invention permits a further reduction in installation space, since conventional bearing arrangements with rollers and cylindrical raceways are, as a rule, adapted only insufficiently to the elastic line of the unbalanced mass shaft and are to be "of excess dimensions" on account of the contact pressures which then occur asymmetrically.

In one particularly preferred refinement of the invention, the unbalanced mass shaft is to be a balancing shaft for balancing mass forces and/or mass moments of a reciprocating piston internal combustion engine. Balancing shafts are known to a person skilled in the art in the field of reciprocating piston internal combustion engines, in particular in an inline or V arrangement, as an effective measure for reducing vibrations as a consequence of oscillating mass forces. A trend which is emerging in this field is the design of the balancing shafts in a manner which is optimized for installation space and weight, including its antifriction mountings which are to be designed for the required service life even in the case of increasing maximum rotational speeds of the internal combustion engine.

As will also become clear using exemplary embodiments of the invention which will be explained later, a balancing shaft of this type can have three unbalance sections and two bearing journals in an alternating sequence. Here, there is provision in a first refinement of the raceways for the inner raceway to have the variable diameter. The inner raceway can run directly on the outer circumferential face of the bearing journal. This is expedient, in particular, in the case of forged unbalanced mass shafts which have a material surface which is suitable as antifriction bearing raceway, since, in this case, an inner ring can be dispensed with for the benefit of the radial installation space requirement which is reduced further.

In an alternative refinement to this, the outer raceway is to have the variable diameter. Here, the outer raceway can run directly on the housing, but preferably on the inner circumferential face of an outer ring which is inserted into the housing.

Furthermore, a combination of the above-mentioned refinements is also conceivable, both the inner raceways and the outer raceways having a variable diameter.

Furthermore, the object which is mentioned in the introduction is achieved by a needle bearing which is adapted to the bearing arrangement, as specified in claim 8. The needle bearing which comprises a cage with the rollers or needles guided in it, and a thin-walled outer ring which is produced without the removal of material is comparable with a needle sleeve which is known per se. However, the inner circumferential face of the outer ring is not of cylindrical configuration, but rather of conical or parabolic configuration. For the case where the inner raceway does not run directly on the outer circumferential face of the bearing journal, the needle bearing is to have, furthermore, a thin-walled inner ring which is produced without the removal of material and has a cylindrical outer circumferential face.

The object which is mentioned in the introduction is likewise achieved by a needle bearing which is adapted to the bearing arrangement, as specified in claim 10. A needle bearing of this type is to comprise a cage with rollers guided in it, an outer ring with a cylindrical inner circumferential face, and an inner ring with a conical or parabolic outer circumferential face. Here, both the outer ring and the inner ring are thin-walled components which are produced without the removal of material and are made from sheet metal material.

BRIEF DESCRIPTION OF THE DRAWINGS

Further features of the invention result from the following description and from the drawings, in which exemplary embodiments of the invention are shown in simplified form. Unless stated otherwise, identical or functionally identical components or features are provided with identical designations here. In the drawings.

DETAILED DESCRIPTION OF THE DRAWINGS

Figure 2:
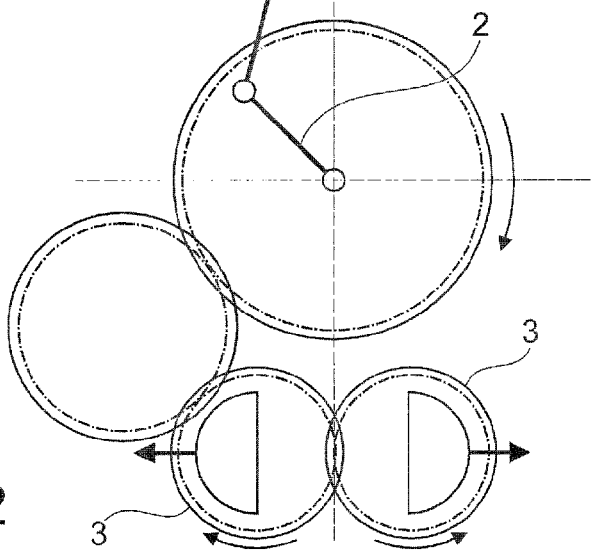
FIG. 2 shows a reciprocating piston internal combustion engine with balancing shafts, in a schematic illustration.

One preferred application of the invention is disclosed in FIG. 2. This is the mass balancing known per se of a reciprocating piston internal combustion engine 1 in a 4-cylinder inline design, which reciprocating piston internal combustion engine 1 has, in order to balance second order mass forces, two unbalanced mass shafts 3 which rotate in opposite directions at twice the rotational speed of the crankshaft 2 and are usually called balancing shafts.

Figure 3:
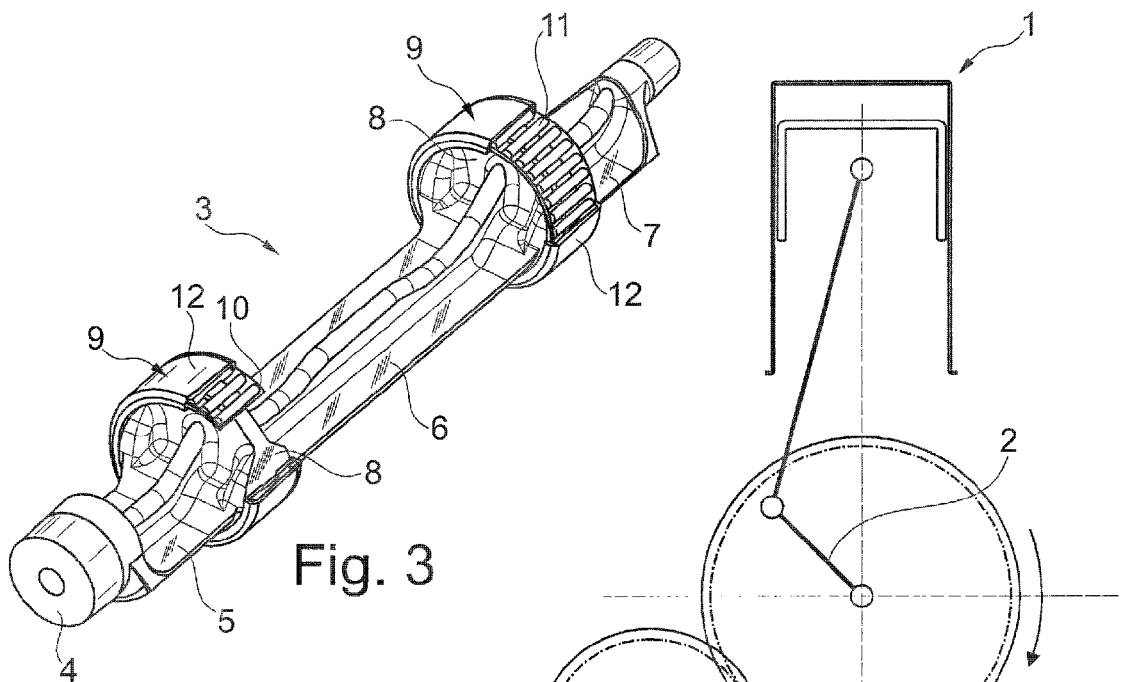
FIG. 3 shows a balancing shaft which is known in the prior art, in a perspective illustration.

A balancing shaft 3 which is selected from a multiplicity of structural design options and is likewise known in principle is apparent from FIG. 3. The balancing shaft 3 has a drive section 4, and three unbalance sections 5, 6 and 7 and two bearing journals 8 in an alternating sequence, on which bearing journals 8 the balancing shaft 3 is mounted by means of antifriction bearings 9 in a housing of the reciprocating piston internal combustion engine 1, which housing is loaded only by lubricating oil mist and is not shown in greater detail here. The sectionally illustrated antifriction bearings 9 are needle bearings which are also called needle sleeves and consist of a cage 10 with rolling bodies 11 guided in it in the form of rollers or needles, and a thin-walled outer ring 12 which is produced without the removal of material.

Figure 1:
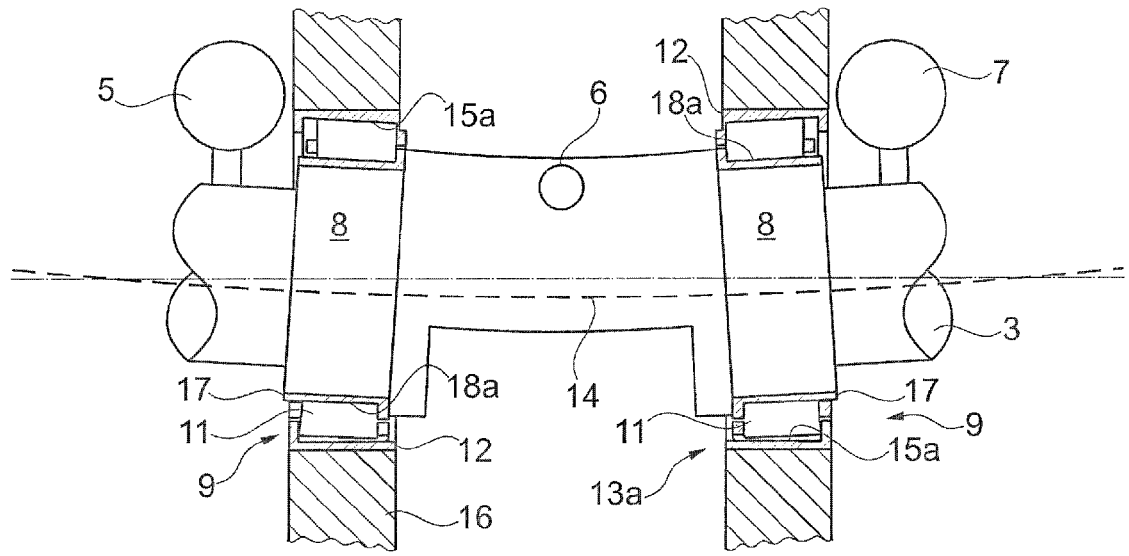
FIG. 1 shows a bearing arrangement according to the invention with a balancing shaft which is deformed at a high rotational speed, in a partially sectioned illustration.

Proceeding from this prior art, FIGS. 1 and 4 to 7 show bearing arrangements 13a-d according to the invention for unbalanced mass shafts 3 which can have, for example, the shape of the balancing shaft 3 according to FIG. 3. The unbalanced mass shaft 3 which is shown in FIG. 1 likewise has three unbalance sections 5, 6 and 7 which are symbolized by means of circles and two bearing journals 8 which are enclosed by needle bearings 9. At a high rotational speed, the unbalance action of the unbalance sections 5, 6, 7 leads to a deformation of the unbalanced mass shaft 3, which is shown in FIG. 1 in a greatly exaggerated manner by way of a corresponding elastic line 14. The associated tilting of the bearing journals 8 in their bearing points is compensated for by the needle bearings 9 by the fact that the outer raceways 15a which are fixed to the housing in the outer rings 12 which are inserted into the housing 16 have a diameter which is variable in the longitudinal direction of the unbalanced mass shaft 3 and is adapted to its elastic line 14. In this concrete case, the inner circumferential face of the thin-walled outer rings 12 which are produced without the removal of material are each of frustoconical or shortly conical configuration in such a way that, when the unbalanced mass shaft 3 is deformed, a contact is produced between the rollers 11 and their outer raceway 15a, which contact is substantially linear in the loadbearing region of the unbalance sections 5, 6, 7. Inner rings 17 which are fitted onto the bearing journals 8 have a cylindrical inner raceway 18a for the rollers 11.

Figure 4:
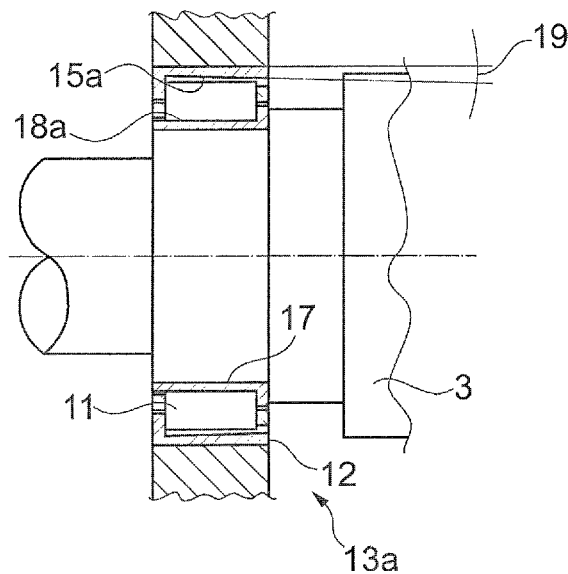
FIG. 4 shows a detailed view of a bearing arrangement with an inner ring and an outer ring, the outer ring having a conical raceway.

For comparison, the bearing arrangement 13a, according to FIG. 1, is shown in FIG. 4 as an enlarged detail of the substantially undeformed unbalanced mass shaft 3 when at rest or at low rotational speed. With consideration of the centrifugal force which acts on the cylindrical rollers 11, it is readily comprehensible that, in this operating state, the rollers 11 can have only punctiform contact with the inner ring 17 with a cylindrical inner raceway 18a and/or the outer ring 12 with a conical outer raceway 15a. It goes without saying here for a person skilled in the art that that cone angle 19 of the raceways 15a and 18b which is illustrated in FIGS. 4 to 7 is shown in greatly exaggerated form in an analogous manner to the elastic line 14 according to FIG. 1, in order to clarify the invention.

Figure 5:
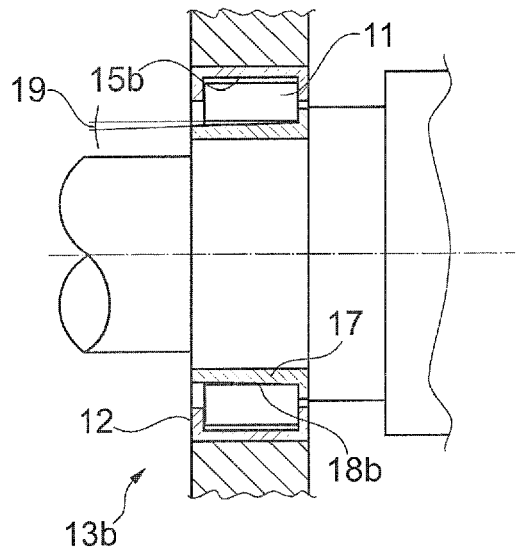
FIG. 5 shows a detailed view of a bearing arrangement with an inner ring and an outer ring, the inner ring having a conical raceway.

The bearing arrangement 13b which is shown in FIG. 5 differs from the bearing arrangement 13a in FIG. 4 by virtue of the fact that that outer circumferential face of the inner ring 17 which serves as inner raceway 18b for the rollers 11 is not of cylindrical configuration, but rather of conical configuration, while the outer ring 12 has a cylindrical outer raceway 15b.

Figure 6:
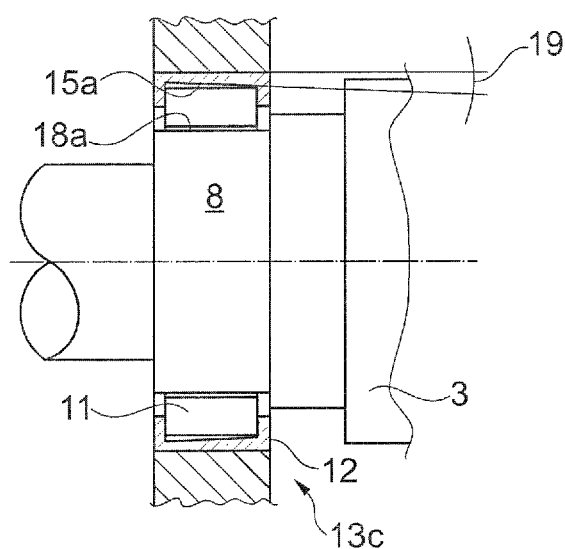
FIG. 6 shows a detailed view of a bearing arrangement without an inner ring, the outer ring having a conical raceway.
Figure 7:
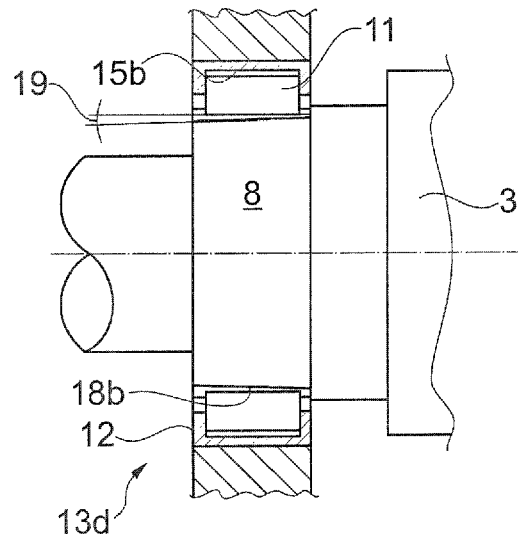
FIG. 7 shows a detailed view of a bearing arrangement without an inner ring, the bearing journal having a conical raceway.

Bearing arrangements 13c and 13d according to FIGS. 6 and 7 are in each case a forged unbalanced mass shaft 3, with the result that the bearing journal 8 has a material surface which is suitable as a raceway for the rollers 11 (cast unbalanced mass shafts are unsuitable for this purpose as a rule). To this extent, the inner ring 17, as is provided in the bearing arrangements 13a and 13b, can be dispensed with and the inner raceway 18a or 18b for the rollers 11 can be provided directly on the outer circumferential face of the bearing journal 8.

The bearing arrangements 13a and 13c which are shown in FIGS. 4 and 6 are each identical to the effect that the outer raceway 15a on the outer ring 12 is of conical configuration, while the inner raceway 18a is cylindrical. The bearing arrangements 13b and 13d according to FIGS. 5 and 7 are identical to the effect that the outer raceways 15b on the outer rings 12 are cylindrical, while the inner raceways 18b are of conical configuration.

List of Designations
1 Reciprocating piston internal combustion engine
2 Crankshaft
3 Unbalanced mass shaft/balancing shaft
4 Drive section
5 Unbalance sections
6 Unbalance sections
7 Unbalance sections
8 Bearing journal
9 Antifriction bearing/needle bearing
10 Cage
11 Rolling body/roller/needle
12 Outer ring
13 Bearing arrangement
14 Elastic line
15 Outer raceway
16 Housing
17 Inner ring
18 Inner raceway
19 Cone angle

The invention claimed is:

1. A bearing arrangement, comprising:
a shaft configured as an unbalanced mass shaft which is mounted rotatably in a housing and has a bearing journal,
an antifriction bearing which encloses the bearing journal,
an inner raceway which is fixed to the shaft, and
an outer raceway which is fixed to the housing for rolling bodies of the antifriction bearing,
the inner raceway or the outer raceway having a diameter which is variable in a longitudinal direction of the shaft and is adapted to an elastic line of the shaft,
wherein the rolling bodies are cylindrical rollers or needle rollers, the raceway with the variable diameter being such that the rollers are in punctiform contact with the inner raceway or the outer raceway at a low rotational speed of the shaft, and are in linear contact with both the inner raceway and the outer raceway at a high rotational speed of the unbalanced mass shaft.

2. The bearing arrangement according to claim 1, wherein the shaft is a balancing shaft for balancing mass forces and/or mass moments of a reciprocating piston internal combustion engine.

3. The bearing arrangement according to claim 2, wherein the balancing shaft has three unbalance sections and two bearing journals in an alternating sequence.

4. The bearing arrangement according to claim 1, wherein the inner raceway has the variable diameter.

5. The bearing arrangement according to claim 4, wherein the inner raceway runs directly on an outer circumferential face of the bearing journal.

6. The bearing arrangement according to claim 1, wherein the outer raceway has the variable diameter.

7. The bearing arrangement according to claim 6, wherein the outer raceway runs on an inner circumferential face of an outer ring which is inserted into the housing.

8. A needle bearing for a bearing arrangement according to claim 1, comprising:
a cage with said rollers guided therein, and
a outer ring which is produced without removal of material and has a conical or parabolic inner circumferential face.

9. The needle bearing according to claim 8, wherein the needle bearing further comprises an inner ring which is produced without removal of material and has a cylindrical outer circumferential face.

10. A needle bearing for a bearing arrangement according to claim 1, comprising:
a cage with said rollers guided therein,
a thin-walled outer ring which is produced without the removal of material and has a cylindrical inner circumferential face, and
an inner ring which is produced without the removal of material and has a conical or parabolic outer circumferential face.

* * * * *

UNITED STATES PATENT AND TRADEMARK OFFICE
CERTIFICATE OF CORRECTION

| | | |
|---|---|---|
| PATENT NO. | : 8,157,451 B2 | Page 1 of 1 |
| APPLICATION NO. | : 12/475073 | |
| DATED | : April 17, 2012 | |
| INVENTOR(S) | : Peter Solfrank et al. | |

It is certified that error appears in the above-identified patent and that said Letters Patent is hereby corrected as shown below:

COLUMN 2:

Line 6, "firstly" should read --firstly,--;
    Line 17, "unbalance" should read --unbalanced--; and
    Line 48, "unbalance" should read --unbalanced--.

COLUMN 3:

Line 45, "raceway," should read --raceway;--.

COLUMN 4:

Line 13, "unbalance" should read --unbalanced--; and
    Line 16, "unbalance" (both occurrences) should read --unbalanced--.

COLUMN 5:

Line 12, "Unbalance" should read --Unbalanced--;
    Line 13, "Unbalance" should read --Unbalanced--; and
    Line 14, "Unbalance" should read --Unbalanced--.

COLUMN 6:

Line 25, "a" should read --an--; and
    Line 34, "a thin-walled" should read --an--.

Signed and Sealed this
Twenty-fourth Day of July, 2012

David J. Kappos
*Director of the United States Patent and Trademark Office*